United States Patent [19]
Gamm

[11] Patent Number: 5,416,773
[45] Date of Patent: May 16, 1995

[54] SWITCHING ELEMENT HAVING CENTRAL MEMORY FOR SWITCHING NARROWBAND AND BROADBAND SIGNALS

[75] Inventor: Bernhard Gamm, Stettiner Strasse, Germany

[73] Assignee: Alcatel N.V., Amsterdam, Netherlands

[21] Appl. No.: 83,685

[22] Filed: Jun. 25, 1993

[30] Foreign Application Priority Data

Jun. 27, 1992 [DE] Germany .................. 42 21 187.5

[51] Int. Cl.⁶ .................................................. H04Q 11/04
[52] U.S. Cl. ........................................ 370/68; 370/59
[58] Field of Search ................... 370/59, 60, 60.1, 61, 370/62, 63, 64, 65, 65.5, 66, 67, 68; 379/15, 58.1, 58.2, 58.3, 91, 92, 93

[56] References Cited

U.S. PATENT DOCUMENTS 4,811,335  3/1989  van Baardwijk et al. ............ 370/63
5,016,247  5/1991  Cidon et al. ........................... 370/63

Primary Examiner—Douglas W. Olms
Assistant Examiner—Dang Ton
Attorney, Agent, or Firm—Ware, Fressola, Van der Sluys & Adolphson

[57] ABSTRACT

A space and time switching element comprises a plurality of input circuits for one input line each, on which a plurality of input signals are receivable in a time-division-multiplex mode, a plurality of output circuits for one output line each, on which a plurality of output signals can be output in a time-division-multiplex mode, and memories for temporarily storing signals, wherein a part of the input circuits and output circuits is provided for narrow-band input and output signals, respectively, and another part of the input circuits and output circuits for broadband input and output signals, respectively, and that via the memories, each narrow-band input circuit is connectable to every broadband output circuit, and each broadband input circuit to every narrow-band output circuit. The narrow-band input and output signals may be synchronous time-division-multiplex signals, while the broadband input and output signals may be asynchronous time-division-multiplex signals. The switching element may connect a broadband digital switching network to narrow-band peripheral units.

5 Claims, 6 Drawing Sheets

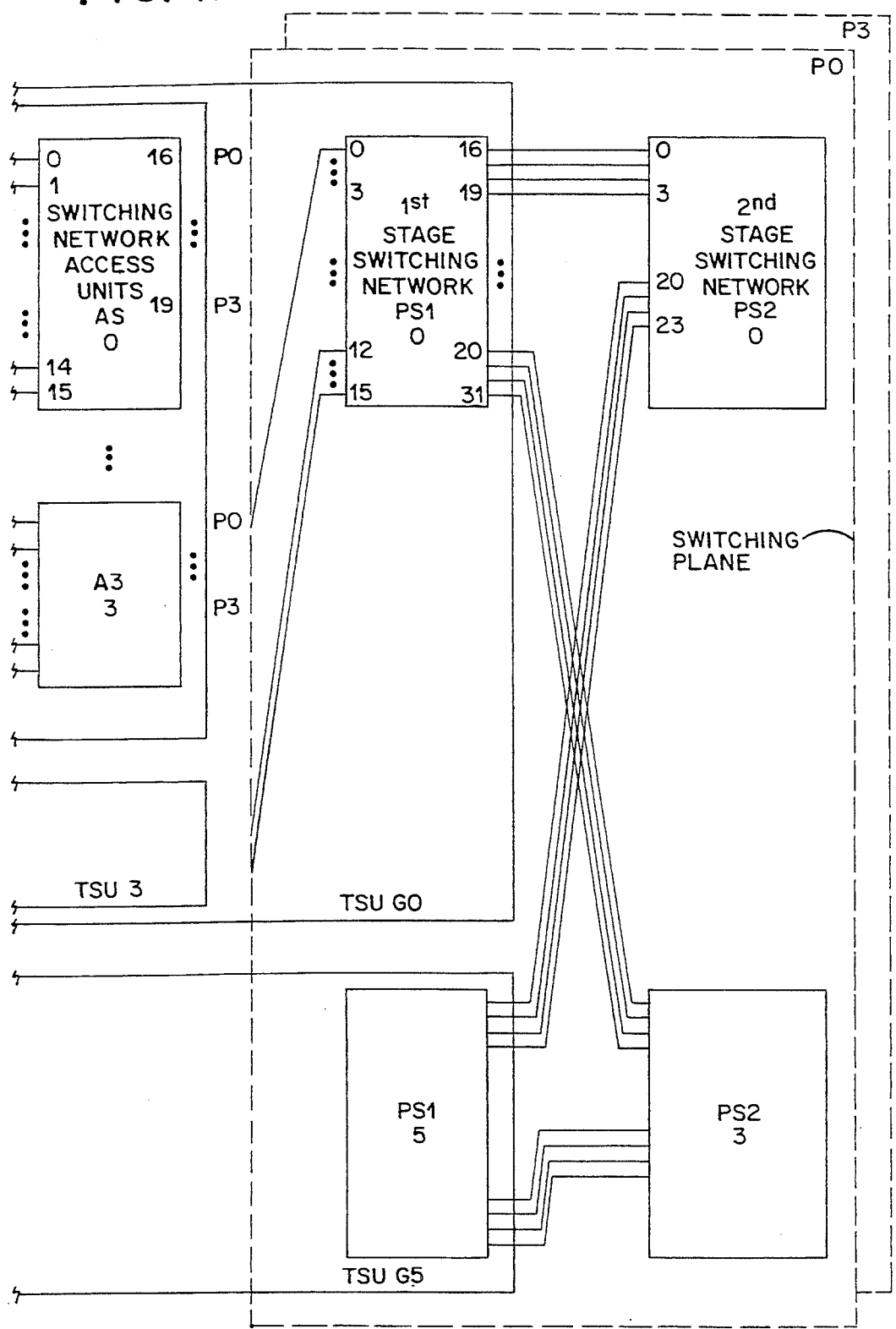
FIG. IB

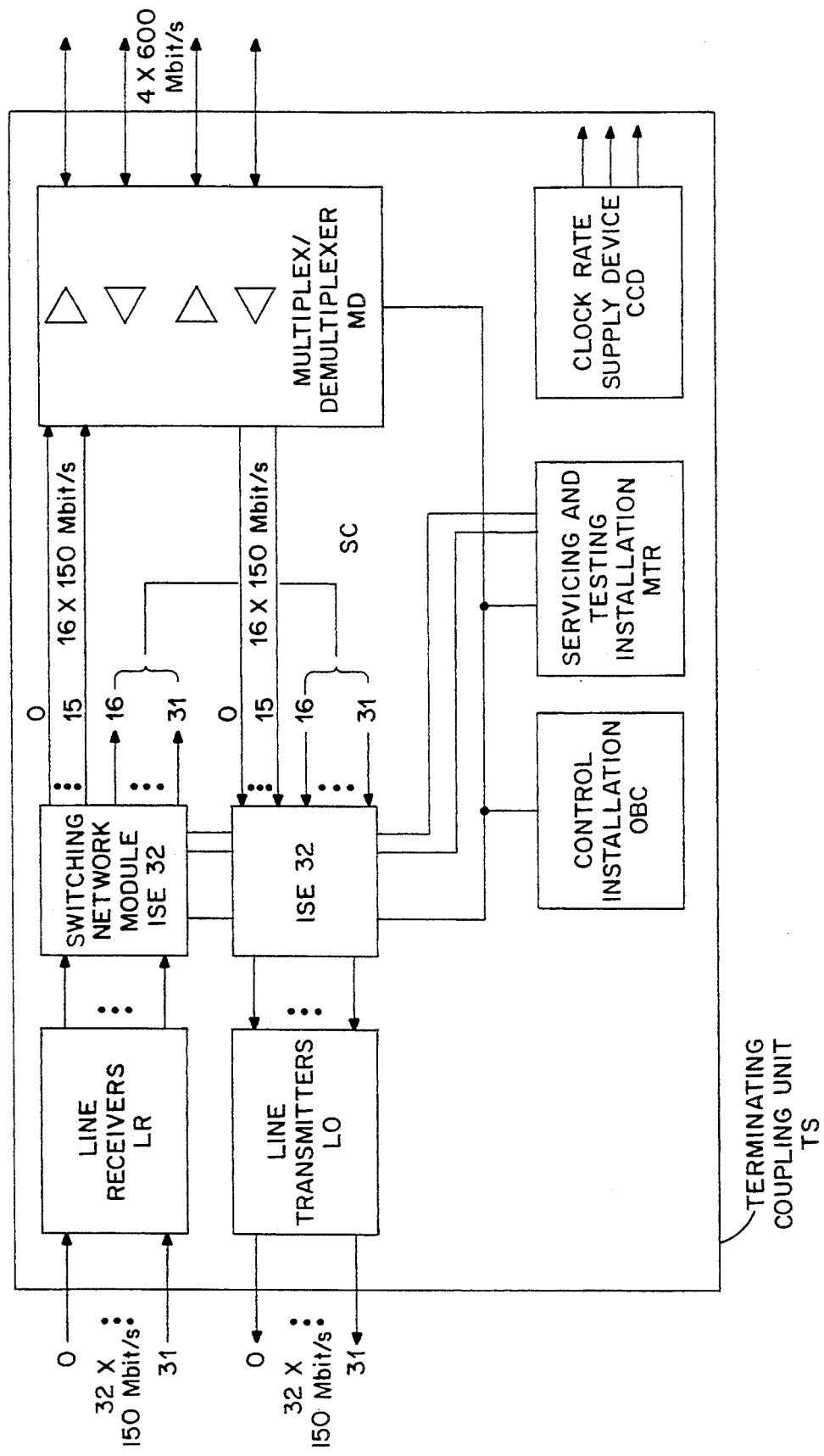

SWITCHING ELEMENT HAVING CENTRAL MEMORY FOR SWITCHING NARROWBAND AND BROADBAND SIGNALS

TECHNICAL FIELD

The invention concerns a space and time switching element for use in telecommunications.

BACKGROUND OF THE INVENTION

At present, a transition is taking place, at least in the development, from the conventional synchronous time-division-multiplex, which is now called Synchronous Transfer Mode STM, to a new transmission mode, the Asynchronous Transfer Mode ATM. With both STM and ATM, the messages to be transmitted are divided into small information units, compressed temporarily and transmitted together with similar information units from other messages.

With STM, the affiliation of the individual information units with a certain message is established by the periodically returning (synchronous) position inside the data stream. The exchange takes place, among others, by a predetermined time shift in the position of the information units.

In the ATM, the affiliation of an information unit with a certain message cannot be determined from the position in the data stream, and must therefore be specially identified. For that reason, each of the information units is compiled into a data packet by a header. In the ATM, these data packets are called cells.

During the certainly long transition time, STM and ATM will appear together and transition installations between STM and ATM will be created. Packetizers and depacketizers are a known solution for this problem. The packetizers and depacketizers described in principle in FIGS. 7 and 8 of DE 38 16 747.6 A1, are only cited here as an example.

SUMMARY OF THE INVENTION

A solution for this problem is provided by a switching element where the narrow-band input and output signals are synchronous time-division-multiplex signals, and that the broadband input and output signals are asynchronous time-division-multiplex signals.

This solution, a switching element with STM and ATM inputs and outputs, is based on the fact that conventional space and time switching elements have memories for the intermediate storage of signals (information units), into which data can be entered from input circuits, and independently read out to output circuits. Packetizers and depacketizers operate in the same way, aside from the addition or omission of the data packet headers and blank information for adaptation of the format. However, these functions can be performed by a suitably configured switching element.

This solution is further based on the fact that different types of transmission meet in exchanges, and that, as a rule, switching elements are already present in the transition between the peripheral units and the switching network of an exchange. Reference is made to the article "SYSTEM 12—Review of the Fundamental Concepts" by R. Van Malderen in "Electrical Communication", volume 59, number ¼, 1985, p. 20–28. The "Access Unit" shown in figure 3, and described with reference to that figure, is such a switching element, however it has the same data format at the inputs and outputs.

The above considerations also apply if not the conventional standard STM process, but any other narrow-band time-multiplex type of transmission, and not the presently favored ATM process, but any other, particularly a synchronous, broadband time-multiplex type of transmission coincide, and a suitable transition installation must be created. Thus the present invention is directed to a space and time switching element comprising a plurality of input circuits for one input line each, on which a plurality of input signals are receivable in a time-division-multiplex mode, a plurality of output circuits for one output line each, on which a plurality of output signals can be output in a time-division-multiplex mode, and memories for temporarily storing signals, characterized in that a part of the input circuits and output circuits is provided for narrow-band input and output signals, respectively, and another part of the input circuits and output circuits for broadband input and output signals, respectively, and that via the memories, each narrow-band input circuit is connectable to every broadband output circuit, and each broadband input circuit to every narrow-band output circuit.

It is considered advantageous to connect a broadband digital switching network with the narrow-band peripheral units, by means of such a switching element.

BRIEF DESCRIPTION OF THE DRAWINGS

The following describes the invention in more detail by means of a configuration example and with the aid of the enclosed drawings.

FIG. 3 shows a block diagram of another module of the exchange in FIG. 1.

BEST MODE FOR CARRYING OUT THE INVENTION

Figure 1:
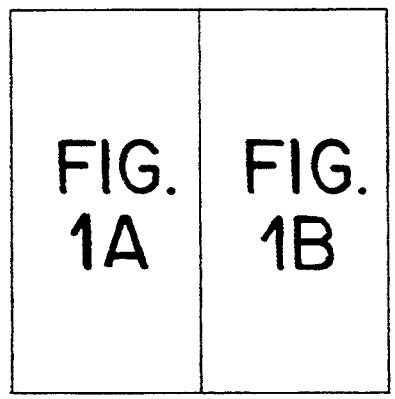
FIG. 1 shows an exchange with a narrow-band periphery and a broadband switching network.

FIG. 1 shows a complete exchange. The representation closely follows the illustration in the above cited article by R. Van Malderen. As is usual with such illustrations, the full assembly is shown. Experts in the art know which parts can be omitted with fewer connections or lower traffic density. The outward leading lines are not shown in this illustration.

The core of the exchange is a main switching array consisting of four planes P0, . . . , P3, which performs the actual switching task. The main switching array is built in two stages. The first stage contains six switching network units PS10, . . . , PS15 in each of the four planes. The six switching network units of the first stage are interconnected in each plane by four switching network units PS20, . . . , PS23 of the second stage.

The entire exchange, with the exception of the second stage of the main switching array, is divided into six main groups TSUG0, . . . , TSUG5. Each of the six switching network units PS10, . . . , PS15 of the first stage forms such a main group with the three corresponding switching network units of the other planes, and four subgroups TSU0, . . . , TSU3.

Each of the four subgroups—FIG. 1 shows subgroup TSU0 of main group TSUG0 in detail—has four switching network access units AS0, . . . , AS3 and eight switching modules MSU0, . . . , MSU7. Like any other switching module, switching module MSU0 consists of two terminating switching units TS0 and TS1 and 32 connection modules, each consisting of one connecting part T0, ..., T31 and one module control unit TCE0, ..., TCE31.

Except for the terminating coupling units TS0, ... and the missing middle stage in the main switching array, this corresponds to the arrangement in an exchange according to SYSTEM 12, as depicted in the article mentioned in the beginning. The same exchange is also described in U.S. Pat. Nos. 4,201,889, 4,201,890 and 4,201,891.

Deviating from the known exchange according to SYSTEM 12, in this instance, however, the operation is at different clock rates and therefore different transmission speeds.

As is the case with SYSTEM 12, the connecting parts T0, ..., T6143, and the module control units TCE0, ..., TCE6143 operate at 4 Mbit/s. The connecting parts, in which the largest portion of the development cost including the greatest part of the software is invested, can be used without any changes.

A transition takes place in the module control units, from 4 Mbit/s to 155 Mbit/s, and vice versa. The number of incoming and outgoing lines is the same on both sides, namely two each. At 155 Mbit/s, the capacity on the broadband side is clearly overdimensioned. This overdimensioning makes it possible for the broadband side to accept many control and signalization tasks concerning the internal operation, with any detriment to the actual switching task. Even the switching of channel bundles (n×64 kbit/s) is possible without the danger of blockage.

A further increase in the transmission speed, from 155 Mbit/s to 600 Mbit/s, takes place in the terminating coupling units TS0, ..., in conjunction with a transition to optical connection lines. This transition is linked to a traffic concentration from 32 input lines to four output lines.

Further concentration is possible up to the second stage of the switching network, without the fear of local blockages.

The broadband side is built with ATM technology in this example. The ATM concept is used here in its somewhat more original meaning. Special standardization of the cell length is not required. Of particular advantage in this instance, even if not mandatory, is the use of ATM-cells of different length in the switching network. The shortest possible length is used for switching a connection with 64 kbit/s; the length of the cells is adapted to the data packets, particularly for control data packets.

The switching network modules AS0, ..., AS3; PS10, ..., PS15 and PS20, ..., PS23 each have 32 inputs and 32 outputs. Their realization is described in "Electrical Communication", volume 64, number ⅔, 1990 "Alcatel Broadband Architecture" by D. Becker et al, p. 147–155, and "ATM Switch Fabric and its Properties" by D. Böttle et al, p. 156–165. There, these switching network units are called switching module or basic switching module. These switching network modules are also described in U.S. Pat. No. 5,091,903.

The construction of a module control unit TCE will now be described by means of FIG. 2.

The module control unit TCE is basically constructed in the same way as the module control unit in SYSTEM 12 that has been cited several times (e.g. according to FIG. 3 in the R. Van Malderen article).

The main part is an access unit BTER, which is completed by a control part with a control processor CC and a respective memory CMEM. In addition, FIG. 2 shows a voltage converter MBC, which transforms the specified 48 V or 60 V operating voltage to the required −5 V voltage, which is grounded on one side.

In principle, the access unit BTER is a switching element. In the present case it has two narrow-band inputs with the narrow-band input circuits IS0 and IS1, and a respective narrow-band input control circuit ICS, and two narrow-band outputs with the narrow-band output circuits OS0 and OS1, and a respective narrow-band output control circuit OCS, as well as two broadband inputs with the broadband input circuits IB0 and IB1, and a respective broadband input control circuit ICB, and two broadband outputs with the broadband output circuits OB0 and OB1, and a respective broadband output control circuit OCB.

The inputs and outputs are interconnected with the aid of a data storage MEM. Data can be entered from every input circuit into every memory element of the data storage MEM; in turn, data can be read out from every memory element to every output circuit. The required multiplexer and demultiplexer functions have not been drawn in FIG. 2. Altogether, it is the same basic construction as in figure 7 of the cited D. Böttle et al. article, or as in figure 5 of the cited U.S. Pat. No. 5,091,903. Furthermore, this basic construction as well as the necessary detail configurations are known to every professional in the field.

In this instance, the broadband inputs and outputs are ATM-inputs and outputs, like in the above named examples, while the narrow-band inputs and outputs are basically like those in SYSTEM 12.

To construct the exchange of SYSTEM 12, reference is made to an article by W. Frank et al, which appeared in 1985 in "Electrical Communication", volume 59, number ½, p. 54–59, under the title "System 12—Dual Port of the Switching Network Module". The already cited U.S. patents for SYSTEM 12 also describe the exchange. Deviating from the realization in SYSTEM 12, a central data storage is however used in this instance, and not a number of data storages assigned to the individual outputs. Synchronization is reestablished if predetermined memory elements of data storage MEM are permanently assigned to the two narrow-band output circuits OS0 and OS1, in this case.

On the narrow-band side, the flow of data between the input circuits, the data storage and the output circuits takes place through 16-bit wide data words transmitted in parallel. 64-bit data words are used on the broadband side. The 16 bits on the narrow-band side correspond to one time slot each in the time multiplex used there. The 64 bits on the broadband side correspond to one ATM data packet each.

A path selection control RC is coupled to data storage MEM. It assigns a packet header to each data word coming from the narrow-band input circuits, which is needed for the exchange in the ATM-switching network and the assignment in the module control unit on the output side. One packet header is uniquely assigned to each time slot in each of the two narrow-band input circuits while the connection is made. Conversely, each packet header from the broadband input circuits is uniquely assigned to a time slot of one of the two narrow-band output circuits. A part of the 64 bits of a broadband data word remains unused.

The access unit BTER further contains a clock rate generator C1, which produces 8 kHz, 4 MHz, 8 MHz and 155 MHz clock rates. These rates are synchronized with externally supplied 8 MHz, 19.44 MHz clock rates and a frame pulse FRAME. The externally supplied clock rates are duplicated for reasons of reliability. The frequency indications are partially rounded off (also differently than with 150 Mbit/s and 155 Mbit/s).

The basic type of the SYSTEM 12 exchange also has the possibility of switching data packets, and letting the module control units communicate with each other through data packets.

These possibilities are available in this instance as well. For that purpose, which among others serves to establish and terminate the connection, a narrow-band control input and output PS, a broadband control input and output PB and a corresponding path guidance device PR are provided. These are connected by a 64-bit wide bus to each other and to the path selection control RC. The control inputs and outputs PS and PB are connected to the corresponding input and output control circuits ICS and OCS, or ICB and OCB, through 16-bit or 64-bit wide parallel data lines. Furthermore, a 32-bit wide bus connects the path guidance device PR to the control processor CC, and to its memory CMEM.

On the narrow-band side, whole data packets including the packet header are transmitted in sequential time slots belonging to the same transmission channel. Data packets arriving in one of the two narrow-band input circuits IS0 and IS1 are recognized as such by the corresponding input circuit controls ICS, and, supported by the control processor CC, they are written to the memory CMEM through the narrow-band control input and output PS and the path guidance device PR. Conversely, data packets assigned to the narrow-band side are read out from memory CMEM through the path guidance device PR, the narrow-band control input and output PS and the narrow-band output circuit control OCS, through the narrow-band output circuit OS0 or OS1 provided there. The exchange of data packets takes place in the same way between one of the broadband input circuits IB0 and IB1 and memory CMEM, and between the latter and one of the broadband output circuits OB0 and OB1. Only the data format is different.

Data packets, which are not assigned to this module control unit, are first written into the memory CMEM from the one side, and are read out from there to the other side. Both take place as described above.

Included also is the fact that the path guidance device PR is supplied with the 155 MHz clock rate by the generator C1, and with the timing marks TSTP from the outside. The timing marks, which are also provided in duplicate, are allocated to the data packets inside the switching network.

Lastly, FIG. 3 describes the construction of a terminating coupling unit TS. The terminating coupling unit TS has two switching network modules ISE32, a muldex ( multiplexer-demultiplexer) ) MD, a control unit OBC, a servicing and testing installation MTR, and a clock rate supply device CCD. Furthermore, line receivers LR and line transmitters LD as well as jumpers SC are provided.

Each of the two switching network modules ISE32 has 32 inputs and 32 outputs. Each switching network module is allocated to one of the two directions. The switching network modules do not essentially differ from the switching network modules of the first or the second stage, PS10, . . . , PS15; PS20, . . . , PS23, and the access switching network modules AS0, . . . , AS3.

From the periphery to the switching network direction, a concentration from 32 input lines to 16 output lines at 150 Mbit/s each takes place. The traffic is redistributed from 16-times 150 Mbit/s to 4-times 600 Mbit/s in the multiplexing part of the muldex MD. In the inverse direction, the demultiplexer part of the muldex MD redistributes from 4-times 600 Mbit/s to 16-times 150 Mbit/s, and in the corresponding switching network module ISE32 it distributes from 16 input lines to 32 output lines.

In addition, on the 600 Mbit/s side, the muldex MD combines the two directions in the same line, and on this side also transforms between electrical signals in the muldex and optical signals in the lines.

Figure 2:
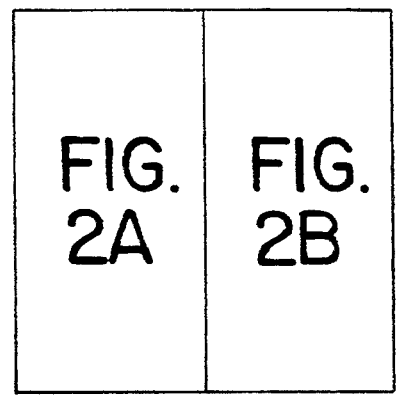
FIG. 2 shows a space and time switching element constructed according to the invention, for use in the exchange in FIG. 1.
Figure 1A:
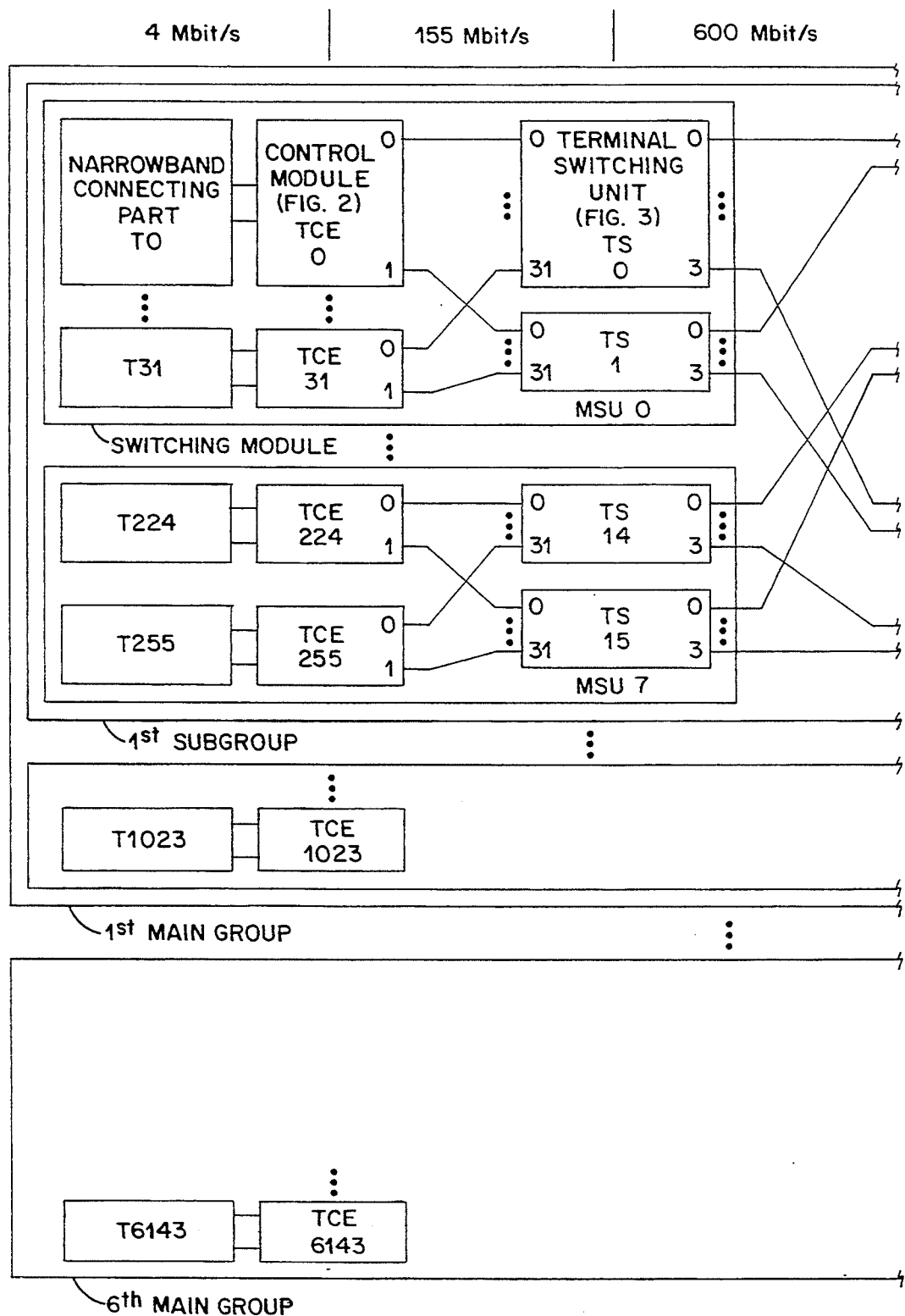
Figure 2A:
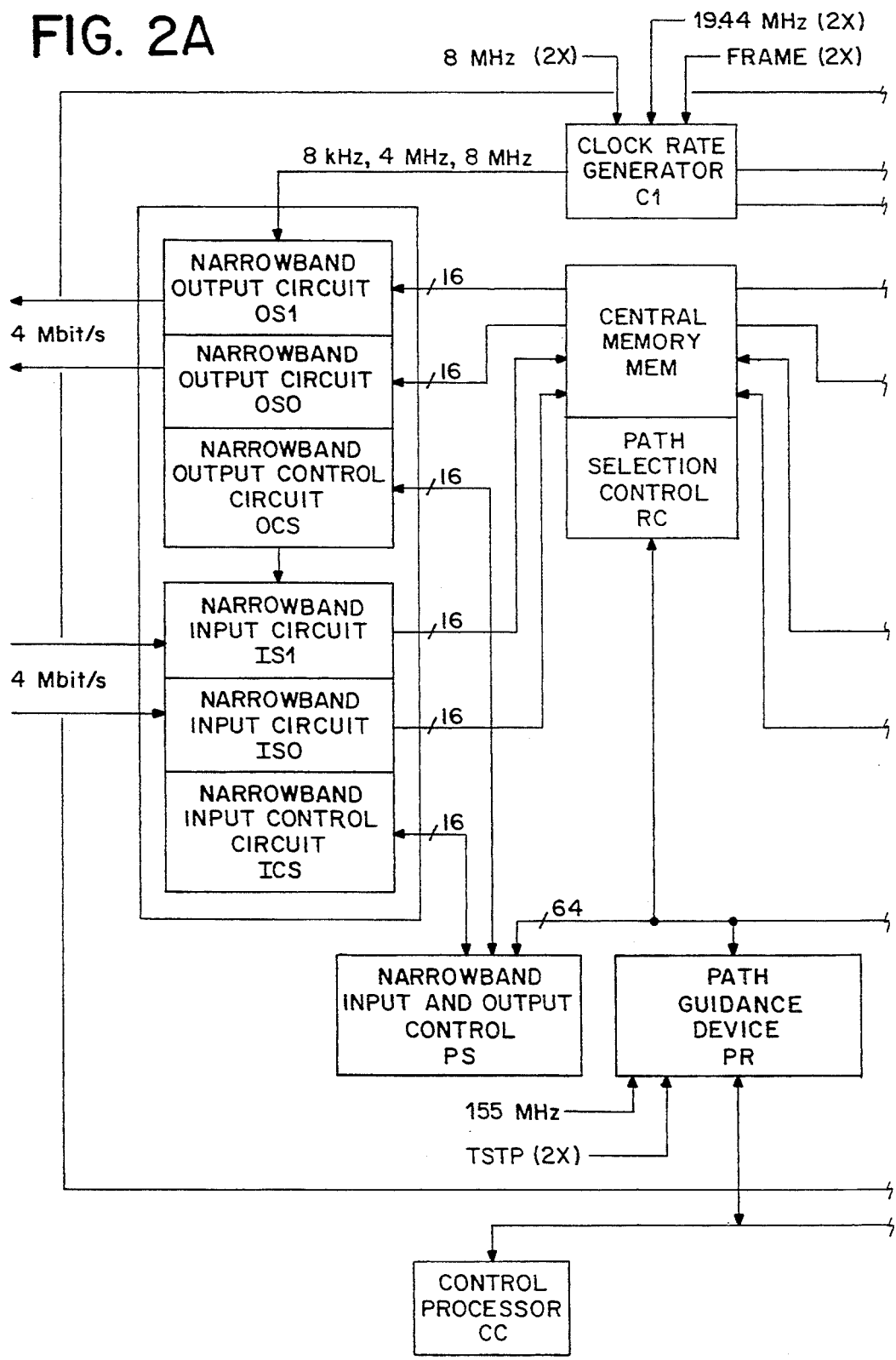
Figure 2B:
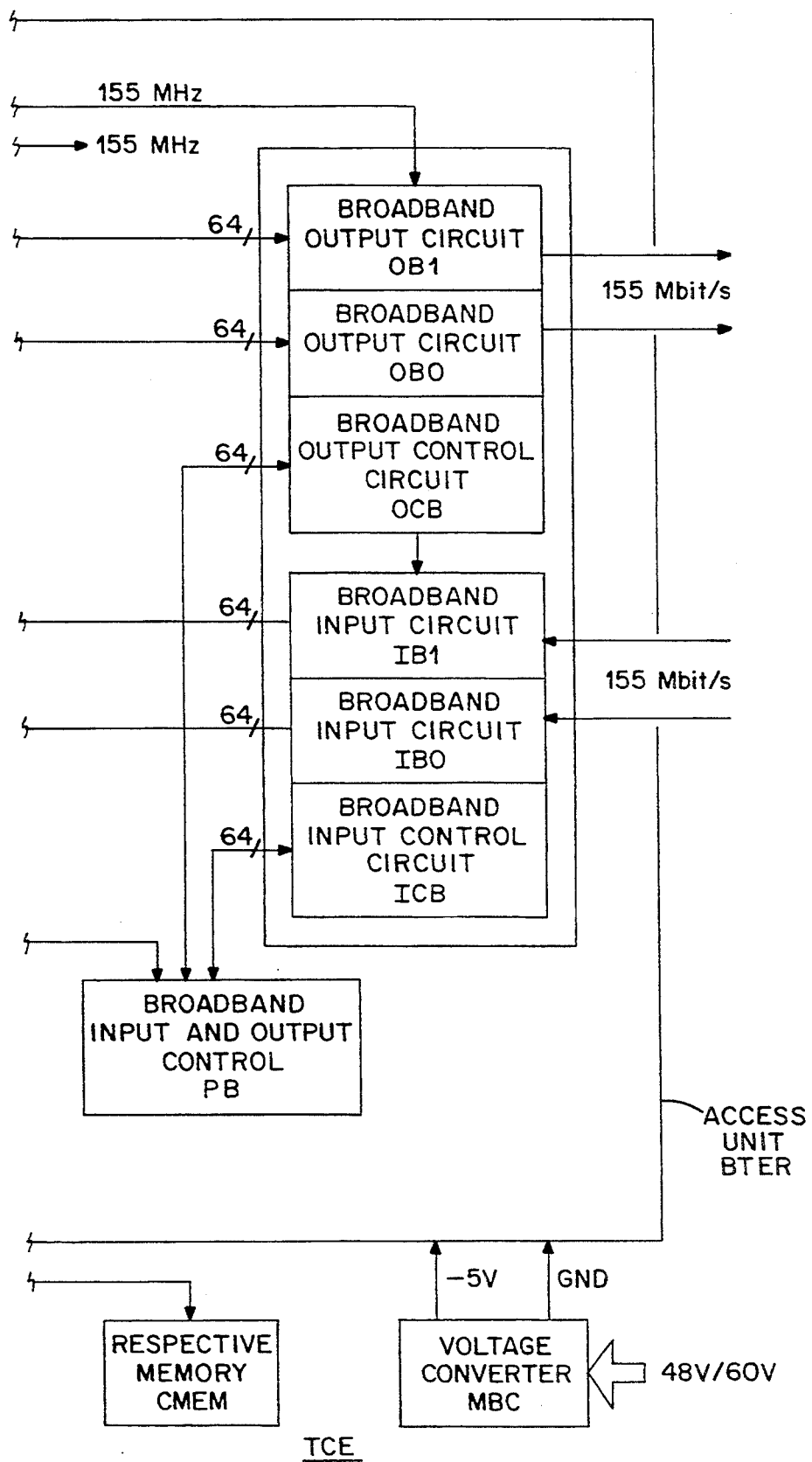

It is also pointed out here that the two directions are explicitly illustrated in FIGS. 2 and 3, while one connection is always drawn for both directions in FIG. 1, independently of whether these are conducted in a common line or in separate lines. This is essentially insignificant.

The still free 16 outputs or inputs of both switching network modules ISE32 may be connected by jumpers SC, to offer an early reversing possibility.

Line receivers LR and line transmitters LD are then used if the length of the lines to the connected module control units requires this.

Control of the terminating coupling unit TS takes place in the known manner with control installation OBC. Also the servicing and testing installation MTR, as well as the line receivers LR, the line transmitters LD and the muldex MD, are constructed in the known manner and are not built according to the invention specification.

The use of terminating coupling units TS is not essential to the invention. Switching network structures without such terminating coupling units could also be used, and basically different switching network structures are possible as well.

What is claimed is:
1. A space and time switching element, comprising:
 a plurality of input circuits (IS0, IS1, IB0, IB1) for receiving a plurality of input signals in a time-division-multiplex mode;
 a plurality of output circuits (OS0, OS1, OB0, OB1) for providing a plurality of output signals in a time-division-multiplex mode;
 at least one of the plurality of input circuits (IS0, IS1, IB0, IB1) having narrow-band input circuits (IS0, IS1) for receiving narrow-band input signals;
 at least one of the plurality of output circuits (OS0, OS1, OB0, OB1) having narrow-band output circuits (OB1, OB2) for receiving narrow-band output signals;
 at least one of the plurality of input circuits (IS0, IS1, IB0, IB1) having broadband input circuits (IB0, IB1) for receiving broadband input signals;
 at least one of the plurality of output circuits (OS0, OS1, OB0, OB1) having broadband output circuits (OB0, OB1) for receiving broadband output signals; and
 a central memory means (MEM) for temporarily storing the plurality of input signals, connecting each of the narrow-band input circuits (IS0, IS1) to each of the broadband output circuits (OB0, OB1), and connecting each of the broadband input cir- cuits (IB0, IB1) to each of the narrow-band output circuits (OB1, OB2).

2. A switching element as claimed in claim 1, characterized in that the narrow-band input and output signals are synchronous time-division-multiplex signals, and that the broadband input and output signals are asynchronous time-division-multiplex signals.

3. A space and time switching element according to claim 1, wherein each of the plurality of input circuits (IS0, IS1, IB0, IB1) is for a respective input line.

4. A space and time switching element according to claim 1, wherein each of the plurality of output circuits (OS0, OS1, OB0, OB1) is for a respective output line.

5. A switching array including a switching plane (P0, P1, P2, P3) having a main group (TSUG0, TSUG1, . . . , TSUG5) with a subgroup (TSU0, TSU1, TSU3, TSU4) that has a switching access unit (AS0, AS1, AS2, AS3) and a switching module (MSU0, MSU1, . . . , MSU7), the switching module (MSU0, MSU1, . . . , MSU7) having a control module (TCE0, . . . , TCE31, . . . , TCE224, . . . , TCE255, . . . , TCE1023, . . . , TCE6143) arranged between a narrowband peripheral connecting part (T0, . . . , T31, T224, . . . , T255, . . . , T1023, . . . , T6144) and a broadband terminal switching unit (TS0, TS1, . . . , TS15), the control module (TCE0, . . . , TCE31, . . . , TCE224, . . . , TCE255, . . . , TCE1023, . . . , TCE6143) comprising:

a plurality of input circuits (IS0, IS1, IB0, IB1) for receiving a plurality of input signals in a time-division-multiplex mode;

a plurality of output circuits (OS0, OS1, OB0, OB1) for providing a plurality of output signals in a time-division-multiplex mode;

at least one of the plurality of input circuits (IS0, IS1, IB0, IB1) having narrow-band input circuits (IS0, IS1) for receiving narrow-band input signals;

at least one of the plurality of output circuits (OS0, OS1, OB0, OB1) having narrow-band output circuits (OB1, OB2) for receiving narrow-band output signals;

at least one of the plurality of input circuits (IS0, IS1, IB0, IB1) having broadband input circuits (IB0, IB1) for receiving broadband input signals;

at least one of the plurality of output circuits (OS0, OS1, OB0, OB1) having broadband output circuits (OB0, OB1) for receiving broadband output signals; and a central memory means (MEM) for temporarily storing the plurality of input signals, connecting each of the narrow-band input circuits (IS0, IS1) to each of the broadband output circuits (OB0, OB1), and connecting each of the broadband input circuits (IB0, IB1) to each of the narrow-band output circuits (OB1, OB2).

* * * * *

UNITED STATES PATENT AND TRADEMARK OFFICE
CERTIFICATE OF CORRECTION

PATENT NO. : 5,416,773
DATED : May 16, 1995
INVENTOR(S) : Bernhard Gamm.

It is certified that error appears in the above-indentified patent and that said Letters Patent is hereby corrected as shown below:

On title page, item [75]:

delete "Stettiner Strasse" and insert --Korntal--.

Signed and Sealed this

Twenty-ninth Day of August, 1995

Attest:

BRUCE LEHMAN

Attesting Officer     Commissioner of Patents and Trademarks